United States Patent [19]

Anger

[11] Patent Number: 4,652,098
[45] Date of Patent: Mar. 24, 1987

[54] END PIECE FOR THE TEMPLE OF A SPECTACLE FRAME

[76] Inventor: Wilhelm Anger, Via Brattas 4, CH-7500 St. Moritz, Switzerland

[21] Appl. No.: 661,224

[22] Filed: Oct. 15, 1984

[30] Foreign Application Priority Data

Aug. 7, 1984 [DE] Fed. Rep. of Germany ....... 3429091

[51] Int. Cl.$^4$ .......................... G02C 5/14; G02C 3/00
[52] U.S. Cl. ..................................... 351/123; 351/156
[58] Field of Search ........................ 351/123, 156, 157

[56] References Cited

U.S. PATENT DOCUMENTS

| 460,576 | 10/1891 | Halbe | 351/123 |
| 4,389,102 | 6/1983 | Piampiano | 351/123 |

FOREIGN PATENT DOCUMENTS

261315 11/1926 United Kingdom ................ 351/123

Primary Examiner—Rodney B. Bovernick

[57] ABSTRACT

A temple end piece for a temple of a spectacle frame comprises an essentially straight first segment in the longitudinal direction of the temple, a connecting segment running downward from the first segment, and a design segment intended to fit on the head and/or behind the ear. The longitudinal design segment is carried by the connecting segment and supported, whereby this support occurs at the longitudinal center or at the lower end of the design segment, so taht at least the upper half of the design segment juts free upward toward the first segment. The connecting segment, the design segment and the transition region between the two are at least partially formed out of such material or even provided with additional elastic regions that the design segment can be deflected against elastic force. This will cause a comfortable, cushioned fit of the design segment on the ear of the wearer of the spectacles and will also cause the design segment under fairly heavy charging to be deflected in such a way that the reacting forces caused by the deflection will restore the spectacles back to their original position and not be dislodged.

36 Claims, 10 Drawing Figures

END PIECE FOR THE TEMPLE OF A SPECTACLE FRAME

This invention relates to an end piece for a temple of a spectacle frame. The temple end pieces of a spectacle frame have the function of keeping the spectacle frame firmly on the head of the wearer of the spectacles and to secure against the slipping of the spectacles forward or downward. In one of the most frequent forms of temple, the so-called golf temple (see DIN 5361, October 1980) the temple end consists of a segment flattened out from the remaining temple and running obliquely to the rear, which segment is intended to repose against the skull with a light, lateral, springy pressure, specifically behind the broadest part of the skull, so that the frame is pulled backward in a wedge effect by the two temple ends of the spectacle frame. In order to attain a sufficiently firm retention of the frame on the skull, relatively large amounts of lateral pressure must be exerted on the skull, which can lead to pressure points and be perceived as unpleasant. In addition, the securing of the frame on the skull by means of this known temple end pieces is unsatisfactory, because they cannot prevent the frame from slipping with a vigorous move of the head and even falling off.

Also known are so-called wire temples, in which the temple end piece is formed as a coiled wire spring extending by rather more than 180 degrees. Such a wire temple reposes against the back of the ear in the hollow between the skull and the auricle. The wire temple can be fitted so that it exercises relatively little pressure and is thus felt to be pleasant while also keeping a firm hold on the spectacles in a reliable manner even in cases of jolts and vigorous movements. Disadvantageous in wire temples, however, is the fact that the end pieces in putting them on have to be placed rather laboriously by hand into their positions behind the ears. In addition, wire temples are comparatively expensive to manufacture, for which reason they are relatively costly.

From U.S. Pat. No. 4,389,102 a temple with an end piece is known that is said to be comfortable and to keep the frame on reliably. This known temple has an end piece similar to that of the golf temple, whereby between the lower end of the temple end piece and its transition region to the remainder of the temple an elastic flexible band is placed under tension that is intended to move in the setting in the hollow between skull and auricle. When the spectacles are in position this band is slightly under tension, through which means it keeps the frame elastically in its desired position on the head. With jolts or vigorous movements the band can in addition deform elastically and owing to the stored deformation energy can ultimately bring the spectacles back into their desired position. A disadvantage of this known temple end piece is that there is the danger that the elastic band will cut into the skin and thus lead to discomforts. If, in order to avoid the latter, it is made relatively thick, it gets to be relatively rigid so that the effect is like that of a normal golf temple. In addition, this known temple end piece has the disadvantage of the fact that the retractibility it exercises when the band is elastically deformed tends to push the end piece obliquely upward so that the end piece was not only pulled back but at the same time shifted upward. The position of the spectacles thus has to be adjusted after being dislodged in spite of the elastic band.

Finally, a temple end piece is also known from German Pat. No. 662.038 in which the remainder of the temple transforms directly into the first segment. This segment of the design embraces the ear in the shape of an arch from behind. The connecting segment is in the form of a loop-shaped spring, the inner side of the curvature of which points inward. This loop-shaped spring at its top end merges directly into the first segment. At its lower end it is connected with the design segment and in fact merges directly into the metalic core of that segment. A plastic covering of the design segment points at its free end in the direction of the first segment. Upon a sharp movement of the head and a shifting of the spectacles on the head as caused by this the connecting segment deforms so that the restoring force comes into play that is meant to bring the spectacles back into their original position again. One favorable feature of this known temple end piece is the fact that the design segment is formed in such a manner that neither a danger exists that it will dig into the skin with increased pressure behind the ear nor—in contract to the wire temple—that it is necessary to straighten out the end piece laboriously behind the ear while allowance is made at the same time for a certain springy resilience because of the fact that the spectacles are held on the head elastically and thus more securely. But also in this known temple end piece the effect is present that when the springy connecting segment has been deformed, the restoring force on the temple end piece pulls obliquely upward and back so that the retracting motion of the spectacle frame is superimposed with a movement in which the first segments of the temple end piece will be pushed upward. For this reason it is frequently necessary to correct the fit of the spectacles.

The task on which this invention is based is to form the temple end piece in this genre in such a manner that the spectacles thus equipped will hold reliably and in case they are shifted will be brought back into their original position as closely as possible without any cost to wearing comfort and witout increasing the difficulty of putting on and removing the spectacles.

According to this invention the design segment is supported in its middle region or below it on the remainder of the temple end piece, thus on the temple. At least the upper half of the temple end piece juts free upward. This novel geometry of the temple end piece causes the design segment to keep obliquely down and back and the forces it directs can if necessary also be exercised obliquely upward and the upper free end of the temple and piece to be most starkly shifted (by comparison to the remaining areas of the design segment) or at least starkly shifted with deflections caused by the inner elasticity of the material of the temple end piece or by forces directed to the rear and made possible by the inner elasticity of the material of the end piece or made possible by spring elements purposefully provided in the temple end piece. This means that the restoring power effectuated by deflection and exercised by the design segment and acting on it as a reacting force will be acting under all the more favorable an angle the stronger the deflection is. The angle is all the more favorable the less the reacting force component is directed vertically upward and working on the temple end piece. This will be all the smaller for the same amount of reacting force the farther the upper end of the design segment is deflected downward. In the known temple end piece by contrast the segment is deflected in a deviation in such a sense that the angle of attack of the force exercised on the design segment or reacting force gets to be increasingly less favorable.

The formation according to this invention, i.e. the pattern of action caused by this in the event of deformation thus causes the spectacle frame qua spectacles to be pulled to the rear in case it shifts from the end pieces without any appreciable pushing up of the endpieces accompanying this backward movement.

The spectacles thus revert to their original position so that the wearer of the spectacles needs to correct the position of the spectacles less often. This is accomplished by virtue of the special nature of the support according to the invention of the design segment on the remainder of the temple end piece, whereby the design segment can be formed so massive and rigid that it will neither cause strong concentrations of pressure—as in the case of an elastic band—nor—as in the case of the wire temple—need be laboriously threaded in behind the ear.

The design segment of the temple end piece according to the invention can be designed in such a manner that it either reposes against the head or simultaneously against the head and behind the ear. Preferably it will lie essentially behind the ear and specifically in the region of the hollow or groove between the auricle and the skull, whereby in a preferred embodiment provision can be made for the design segment to be bent three-dimensionally to fit the shape of head and ear, specifically in arc form in such a manner that the inner side of the curvature faces the ear and is diagonal to the skull. By virtue of the fact that the design segment also in the rear rests at the auricle, the puling forces arising in the temple need not be introduced laterally via wedge effect and adhesive force into the skull, but can be adsorbed by the ear direct. With a given pulling force in the temple this allows for the least possible pressures in the contact region of the design segment. This means in other words that the design segment lies fully against the skin on the ear and/or skull and presses into the skin scarcely if at all. Through this means in turn the spectacles are prevented from slipping out of place, which can lead to the formation of a pressure groove, so that because of the formation, according to this invention, of the temple end piece the spectacles will not only return to their original position after being shifted out of position, but are better protected in normal use against slipping out of place. By virtue of the dimensions of the first segment, the connecting segment and the design segment of the temple end piece as well as because of the elastic property of all elements of the temple end piece the force and direction can be predetermined exactly which the design segment will take at a certain deflection at the ear or head, so that it is possible to tailor this force exactly to the spectacles, with especial regard to its weight, and to the person wearing them.

The temple end piece will preferably be made of an elastic material that will keep its shape and that will afford the temple end piece an inner elastic flexibility. For a more exact control and effect of the deflection movements of the various elements of the temple end piece elastic elements can in addition be provided in the resilient region or the elements of which the temple end piece consists can itself be formed as elastic elements. It will be important for the temple end piece according to the invention that the design segment is held and conducted in such a manner that a deflection of this design segment occurs, the deflection movement will not cause an impairment of the intensity of force of the design segment. For this the geometry of the elements of the temple end piece and the distribution of the resilient properties to the elements are well adapted. This holder and guide of the design segment at the same time makes it possible for the design segment be go readily into the proper position when the spectacles are put on and through this to avoid concentrations of pressure. It should also be mentioned that in the temple end piece according to this invention the slightest force is necessary to deflect the upper end of the design segment by a certain amount, which causes it to happen that precisely that area of the design segment that must conceivably absorb the share of the weight of the spectacles to be supported by the assigned spectacles will have great if not the greatest flexibility and can thus be easily set into the best position possible.

The temple end piece according to this invention can be made both as a separate component and connected to the remainder of the temple after it has been made or it can be made simultaneously with the rest of the temple, whereby the remainder of the temple will then merge directly into the first segment of the temple end piece and the first segment of the temple end piece will be the back end of the shaft of the temple.

Additional advantages and characteristics will be found in the dependent claims and from the following description of preferred embodiments with reference to the drawings. The following are shown:

| REFERENCE NUMERALS USED IN THE DESCRIPTIONS AND DRAWINGS | | DE 4066 | |
| --- | --- | --- | --- |
| 2 | segment | X | contact region |
| 4 | insertion aperture | Y | contact region |
| 6 | connecting segment | FO | reacting force |
| 8 | transition region | FA | reacting force |
| 10 | design segment | | |
| 12 | transition region | | |
| 14 | end | | |
| 16 | elastic region | | |
| 18 | elastic region | | |
| 20 | middle region | | |
| 22 | recess | | |
| 24 | recess | | |
| 26 | middle region | | |
| 30 | middle line | | |
| 32 | end region | | |
| 34 | slot | | |
| 36 | end region | | |
| 38 | slot | | |
| 40 | connecting device | | |
| 42 | plug | | |
| 44 | plughole | | |
| 46 | collar | | |
| 48 | indentation | | |
| 50 | indentation | | |
| 52 | bridge | | |
| 54 | ball | | |
| 56 | ball-socket | | |
| 58 | lug | | |
| 60 | ring element | | |
| 62 | end | | |
| 64 | axis | | |
| 66 | axis | | |
| 68 | cement channel | | |
| 70 | corrugated tube spring | | |
| 72 | region | | |
| 74 | plug | | |
| 76 | flange | | |

In the following the first preferred embodiment will be explained with reference being made to the FIGS. 1 through 4.

Figures 1, 2, 3:
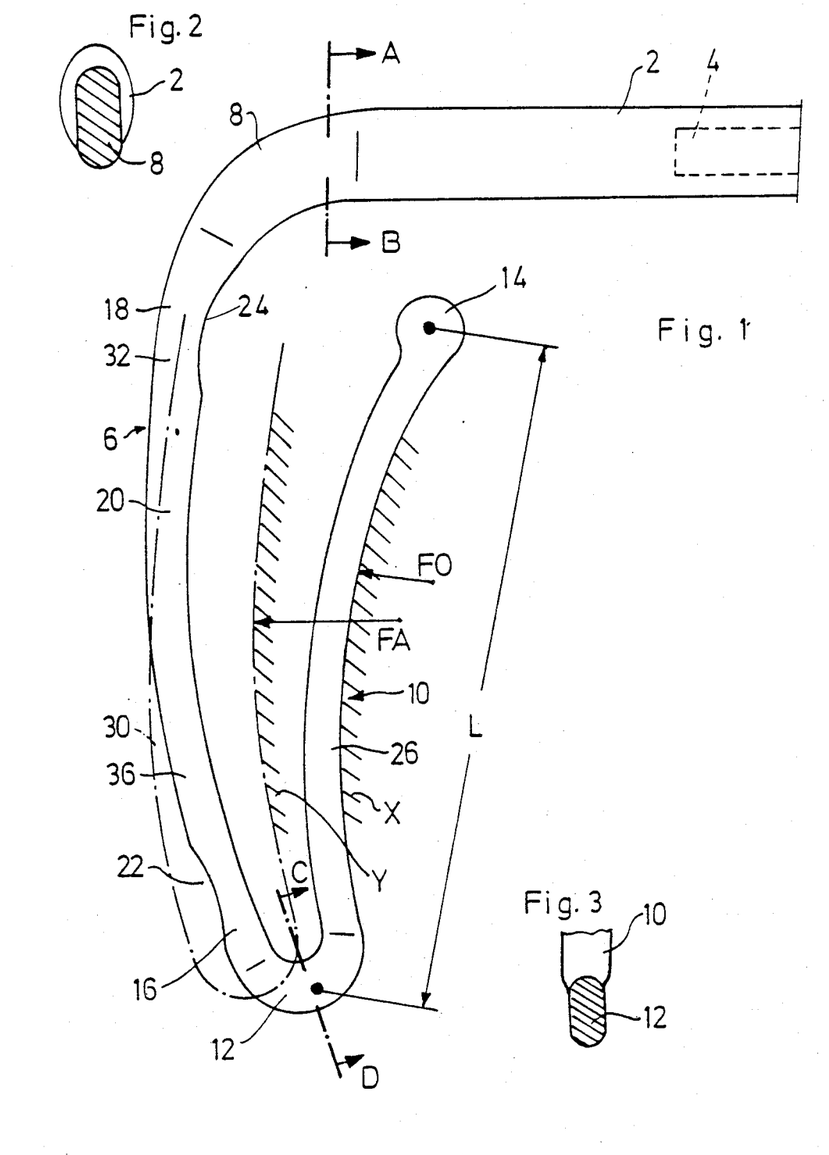
FIG. 1 a laterial view of a first preferred embodiment of a temple end piece.
FIG. 2 a sectional representation according to A—B in FIG. 1.
FIG. 3 a sectional representation according to C—D in FIG. 1.

The temple end piece illustrated has a long, straight first segment 2 that can either be formed in one piece with a temple shaft not shown or—as in the case depicted—can be connected to the end of the temple end piece not shown, for which purpose the first segment has an insertion aperture 4. The first segment 2 has the profile of a rounded-off rectangle.

On the lower end, as in the left in FIG. 3, of the first segment 2 this segment is connected to the upper end of a connecting segment 6. The first segment 2 and the connecting segment 6 are formed together in one piece; the ends connected to one another form a transition region 8. This transition region 8 is curved in an arc-shape and goes from a first segment running essentially horizontally gradually into the connecting segment 6 running essentially vertically, the latter being curved in an arc, whereby the inner side of the curvature is turned in FIG. 1 to the right. When the spectacles are put on this inner side of the curvature will thus be facing the ear.

At its lower end the connecting segment 6 is connected to the lower end of a design segment 10. These two ends form a transition region 12. The connecting segment 6 and the design segment 10 are formed together in one piece. The transition region 12 is curved in an arc and gradually moves from from the more slightly curved connecting segment to the design segment 10 running essentially vertically to the first segment 2.

The design segment 10 is curved in an arc, as may be seen in FIG. 1, whereby the inner side of the curvature faces ahead toward the ear, i.e. to the right in FIG. 1. The design segment 10 has the purpose of coming into a snug position on the head and/or behind the ear and thus to support the back end of the temple. This support of the back end of the temple serves the purpose of passing a part of the force of weight of the spectacles to the head and in addition of securing the spectacles from shifting forward or slipping down on the bridge of the nose. Preferably the design segment 10 will rest at the rear at the ear, specifically in the region of the hollow or groove between the skull and the ear. As may be seen in FIG. 4, the design segment 10 is not only in the drawing plane of FIG. 1, but in addition is curved vertically, whereby by virtue of this additional curvature the design segment is adapted anatomically in its course to the form of the ear and the hollow at the transition between the ear and the skull in order to make in this manner the contact surface as large as possible and thus with the given force the pressures arising as small as possible. As may also be seen in FIG. 4, the design segment 10 and the first segment 2 as well as the connecting segment 6 do not lie at the same plane, so that the first segment 2 in particular is kept at an interval if only a small one from the skull (not shown), which would appear in the diagram in FIG. 4 to the right of the temple end piece depicted there. Deviating from the representation in FIG. 4, the first segment 2 and the connecting segment 6 can also be curved at right angles to the drawing plane of FIG. 1 in order to adapt these segments to the form of the skull, whereby they can also come into contact with the skull.

The design segment 10 is approximately as long as the connecting segment 6. Its free upper end 14 comes to an end at a certain distance from the first segment 2 and below it. The length of the design segment 10 has been selected in such a way that the segment can perform the support function described above, that high local pressures are prevented, the the temple end piece can be placed behind the ear in a simple fashion when the spectacles are put on and when they are taken off easily removed from behind the ear, and that the design segment will not shift in a vertical direction from even slight jolting, but is held by adhesive friction or form locking. This design segment can also reach farther down than illustrated, for example across the mount of the petrosal of the skull not shown, and farther up than illustrated, for example to the upper ear appendage. With these points in mind, the design segment 10 will have a length L in actual practice of 20 to 40 mm.

The design segment in the preferred embodiment illustrated has a circular profile with a cross-sectional area over the entire length of this design segment 10. The strength and thickness of this design segment 10 and the material properties are so attuned to one another that the design segment 10 is a springy element in the manner of a leaf spring. At its upper end 14 the design segment is thickened in the form of a circle, as may be seen in FIG. 1, whereby this circular thickening is flattened out, as may be seen in FIG. 4.

The transition region 12 is also flattened out, as may be seen in FIG. 3, whereby the lattening out of the transition region 12 is situated approximately in the drawing plane of FIG. 1, i.e. the plane defined by the design segment 10 and the connecting segment 6. In the preferred embodiment illustrated the second transition region is somewhat resistant to bending.

The connecting segment 6 manifests an elastic region 16 near its lower end. In addition, the connecting segment 6 manifests near its upper end a further, upper elastic region 18. The cross-section profile of this connecting segment 6 is circular in shape or oval and has over its entire length the same surface, whereby the connecting element 6, however, tapers somewhat starting at its upper end. The elastic regions 16 and 18 also do not have the same cross-section profile as the middle region 20 of the connecting segment 6. A recess 22 and 24 is found in each of the elastic regions, by virtue of which the cross-section faces of the connecting element 6 are narrowed in the elastic regions 16 and 18 by comparison to the middle region 20 and the remaining area of the connecting segment 6. The two elastic regions 16 and 18, in which the connecting element 6 will accordingly be weakened, work thus in the manner of a spring joint, i.e. of a joint in which resilient forces counteract deflections out of the normal position. In addition, the dimensions and the material properties in the connecting segment 6 are attuned with one another in such a fashion that the connecting segment is a resilient element in the manner of a leaf or wire spring, whereby this leaf spring is more rigid than the leaf spring formed by the design segment 10.

The transition region 8 is flattened out, as may be seen in FIG. 2 especially, whereby the flattening out is found essentially in the plane formed by the first segment 2 and the connecting segment 6. The transition region 8 connects the first segment 2 and the connecting segment 6 relatively rigidly.

As will be determined from the above detailed description and seen in the figures, the design segment 10 as in the first preferred embodiment is solely held and supported on its lower end. The entire remainder of the design segment 10, i.e. both its upper as well as its lower half in addition to its middle region 26 juts out free above.

In view of the above detailed description the temple end piece has elastic properties and a certain deflecting pattern upon charging. The temple end piece is represented in FIGS. 1 through 4 with complete lines in its relaxed condition. At the same time this representation can be interpreted as the representation of the temple end piece of the spectacles being in position, the design segment 10 of which would be deflected in the relaxed position in FIG. 1 somewhat more to the right and is brought into the position shown in FIG. 1 with drawn-out lines at normal charge with the spectacles worn in position. The latter-mentioned perspective is based as follows. The contact region X is schematically indicated in hatchings in FIG. 1 within which the design segment 10 is in contact with the ear and head with the spectacles sitting in position and with no particular forces working on the spectacles, but merely the force of its weight. By virtue of the elastic properties of the design segment 10, of the elastic regions 16 and 18 and of the remainder of the connecting segment 6 the temple end piece can yield in the required measure when the spectacles are put on that the design segment 10 fits against the head and ear and lies snugly without sharp pressure points. By virtue of the support given by the design segment 10 solely at its lower end with the effect of a given force on this design segment 10 its upper end is most sharply deflected, this approximately along a curve around the second transition region 12. Even when the share of weight force coming from design segment 10 and devolving to the temple assigned to the temple end piece is to be initiated, the above described deflecting pattern of the design segment 10 has the advantage of the fact that precisely the upper segment of design segment 10, which must overwhelmingly support this share of the weight, has the greatest resilience and can easily move by the effect of this share of the force of weight into a position in which no disturbingly high pressures occur in the region of contact.

If stronger forces directed to the right in FIG. 1 occur in the temple not shown essentially running along its longitudinal direction, as for example might occur with a rather sharp head movement or jolts against the spectacles, the temple end piece will deform more sharply. The middle line 30 in FIG. 1 of the deformed temple end piece is represented to show such an instance, but only for the connecting segment 6, the transition region 12 and the design segment 10 since the first segment 2 and the transition region 8 undergo practically no deformation.

A pulling force directed to the right as seen in FIG. 1 in the temple not shown causes a reacting force exercised by the ear or skull on the temple end piece on the right in FIG. 1 and this force is transferred in the contact region. By virtue of this stressing the connecting segment 6 is deflected somewhat clockwise as seen in FIG. 1 in the joint formed by the upper elastic region 18. At the same time the connecting segment 6 is somewhat extended, because of its property as a leaf spring. In the spring joint formed in the lower transition region 12 a deflection occurs in a counter-clockwise direction, and the design segment 10 is somewhat extended owing to its property as a leaf spring and is deflected at its lower end in a counter-clockwise direction. By virtue of this course shown in FIG. 1 by the middle line 30 results. The design segment 10 is directed somewhat more steeply, i.e. deflected in a counter-clockwise direction, and shifted to the left as seen in FIG. 1. For this deflected position of the design segment 10 contact region Y is in turn schematically indicated in hatchings, whereby it is understood that the design segment 10 is situated in deflected position with its surface and not with its solely illustrated middle line. Because of the described deflection movement and shifting of the design segment 10 the contact region Y is located somewhat deeper than contact region X. For both contact regions X and Y the resulting reacting force from the ear and skull to the design segment is shown schematically in FIG. 1 by an arrow, specifically as reacting force FO for the spectacles in position without any particular charge and as reacting force FA for an instance of sharp deflection of the design segment 10. From the above explanation it will follow and can be seen in FIG. 1 that the directions of the reacting forces FO and FA differ from one another through the fact that reacting force FA runs "flatter" than reacting force FO does, i.e. that the direction of the reacting force FA has arisen from a turn in a counter-clockwise sense from the direction of the reacting force FO. The share of the force component of reacting force FA directed vertically upward is less because of this and the share of the force component of reacting force FO. The reacting force FA which attempts to bring the temple end piece and thus the entire spectacles back into their original position thus will have the desired strong horizontal force component in essence to attempt to pull the spectacles backward, i.e. to the left as seen in FIG. 1 and only a relatively weak force component directed upward or none at all which would lift up the temple end piece in an undesired manner.

The springing and deflecting pattern of the temple end piece described in the above is caused essentially by the geometric relation between the first segment 2, the connecting segment 6 and the design segment 10, i.e., by the fact that the design segment has a relatively long end region jutting free upwards. Through this means it is basically set out in which manner the region of this structure will shift under charging. This shifting is supported and controlled by an appropriate choice of the resilient properties of the three segments of the temple end piece and, if required, by providing special elastic areas.

The temple end piece described offers several possibilities for individual adaptation to the person wearing the spectacles. The total temple length can be affected or changed by choosing or changing the length of the first segment 2. The flattened out first transition region 8 offers the possibility of deforming the temple end pieces permanently with the application of heat and employing a tweezer-like tool, for example, to use plastic reshaping in this region, as for example, to change the direction of the connecting segment 6 to the first segment 2 and within certain bounds the length of the transition region 8 as well. The same is true by analogy for the second transition region 12. By enlarging the depth of the recesses 22 and 24 the spring regions 16 and 18 can be made more elastically pliant. In a variant to the preferred embodiment shown in the illustration the design segment 10 can also be provided with varying degrees of rigidity over its length. It will be desirable, for example, to made the elastic rigidity of the design segment 10 relatively the highest near its lower end so that a certain joint effect will be present there.

In the following the second preferred embodiment is explained with reference to FIG. 5, whereby the same reference signs and numerals will be used for identical or analogous parts in the first preferred embodiment and essentially only the difference from the first preferred embodiment will be discussed.

Figure 5:
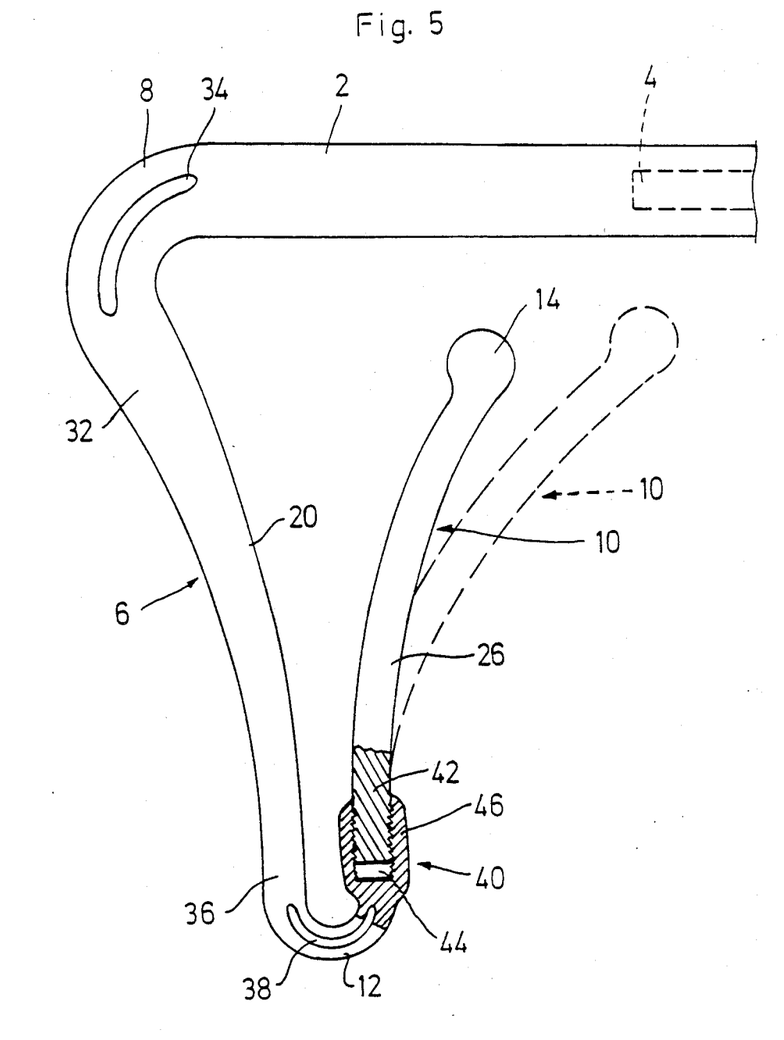
FIG. 5 a representation corresponding to FIG. 1 of a second preferred embodiment.

In the second preferred embodiment according to FIG. 5 the connecting segment 6 is curved in a circle, whereby the inner side of the curvature, however, is turned away from the ear. In addition, the cross-section face of the connecting segment 6 changes over its entire length, whereby it tapers, starting from its upper end. By virtue of this the connecting segment 6 is relatively rigid in its end region 32 and also still in its middle region. The curvature provided for in the second preferred embodiment creates more free space for the deflection of the upper end 14 of the design segment 10 than is available in the first preferred embodiment.

The transition region 8 in the second preferred embodiment is not flattened out, but essentially has the same profile as in first segment 2 and the end region 32. In the transition region 8 a slot has been formed, which follows approximately the curvature of the transition region 8 and by which the transition region 8 is attenuated. In this manner the transition area 8 is formed as an elastic region representing a spring joint between the more rigid first segment 2 and the more rigid upper end region 32 of the connecting segment 6. In a similar manner the transition region 12 is formed, which is also not flattened out, but has approximately the cross-section profile of the lower end region 36 of the connecting segment 6 and is provided with a slot following the curvature of the transition region 12. This slot attenuates the transition region 12 and makes this into an elastic region that is more elastically pliant than are the bordering ends of the connecting segment 6 and of the design segment 10, thus forming a spring joint between these two segments. The transition regions 8 and 12 formed as an elastic region thus fulfill the function in the second preferred embodiment according to FIG. 5 of the elastic regions 16 and 18 of the first preferred embodiment, which are accordingly not provided for in the second preferred embodiment. In order to be able to set or change the elastic properties of the two transition regions 8 and 12, provision can be made as a variant of the second preferred embodiment for a suitable insertion to be inserted into the slots 38 and/or 34. By virtue of the inserts, for their part of varying rigidity, the rigidity of elasticity of the respective transition regions 8 and 12 can be controlled and determined.

In contrast to the one-piece formation of connecting element 6 and design segment 10, these two segments in the second preferred embodiment are first manufactured as separate components and connected by means of a connecting device 40 to one another. This connecting device is comprised of a plug 42 that is formed on the lower end of the design segment 10 and is knurled on its outside, and is equipped with a plughole 44 in a collar 46 formed on the second transition region 12, i.e. the lower end of it. The collar essentially points upward toward the first segment 2. The plug is inserted into the smooth plughole 42, whereby by virtue of a cold-flow of the plastic material called for a firm notch connection has been made. The initially separate making of the connecting segment 6 and the design segment 10 makes it possible to combine an otherwise given temple end piece with various design segments 10 at choice, depending on the individual needs of the person wearing the spectacles. Instead of the design segment 10 shown in complete lines the design segment 10, for example, shown in broken lines in FIG. 5 can be used.

It will be understood that in a variant from the preferred embodiment illustrated in FIG. 5 the collar 46 can be formed on the design segment 10 and the plug 42 can be provided in the transition region and that in addition the connecting device 40 can be placed on the left end of the transition region 12 instead of the right end as seen in FIG. 5.

Figure 6:
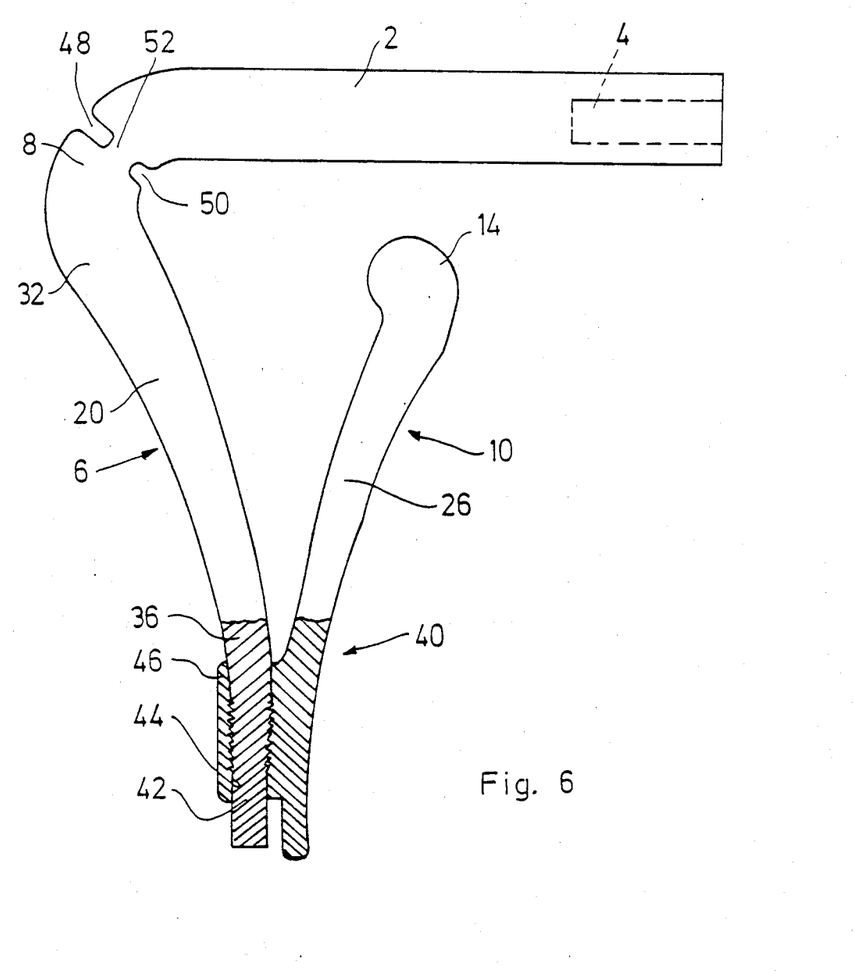
FIG. 6 a representation corresponding to FIG. 1 of a third preferred embodiment.

The third preferred embodiment according to FIG. 6 is similar to the second preferred embodiment according to FIG. 5. Also in the third preferred embodiment according to FIG. 6 the first transition region 8 is formed as an elastic region, whereby this configuration in the preferred embodiment according to FIG. 6, however, is not accomplished by means of one slot following the curvature of the transition region 8, but by means of two essentially radial indentations 48 and 50 approximately in the middle of the transition region 8, which between them leave standing a bridge 52 running vertical to the drawing plane of FIG. 6. It can be seen that also in this configuration the transition region 8 is an elastic region and forms an elastic joint.

As in the second and third preferred embodiments the connecting segment 6 and the design segment 10 are made separately and connected together by the help of a connecting device 40 comprised of a collar 46, a plughole 44 formed in it and a plug 42 with notched protrusions inserted into the smooth plughole. The plug 42, however, at the lower end of the connecting segment 6 runs approximately vertical to the first segment 2 in its formation while the collar 46 is formed in one piece with the design segment 10. The collar 46 is on the design segment 10 below the longitudinal center of the latter and formed on it on the side facing away from the ear. The plughole 44 is formed as a through-borehole so that the plug 42 can jut below out of the borehole and relatively larger margin is given to arrange the collar 46 on the plug 42. This makes it possible to adjust the interval between the first segment 2 and the design segment 10 in the manner desired and thus to accommodate the fitting to the individual person wearing the spectacles.

In FIG. 6 it can also be seen that the design segment 10 near the transition region formed by the connecting device 40 is at its most slender and thus has the least elastic rigidity at this point so that the mobility of the temple end piece according to the third preferred embodiment is furnished essentially by the flexibility of the transition region 8, the elastically pliant formation of the design segment 10 in the vicinity of the connecting device 40 and the leaf-spring formation of the remainder of the design segment 10. The end region jutting free upwards of the design segment 10 in this preferred embodiment occupies significantly more than half of the length of the design segment 10, so that when burdened a similar shifting of the design segment 10 occurs as in the first preferred embodiment.

Figure 7:
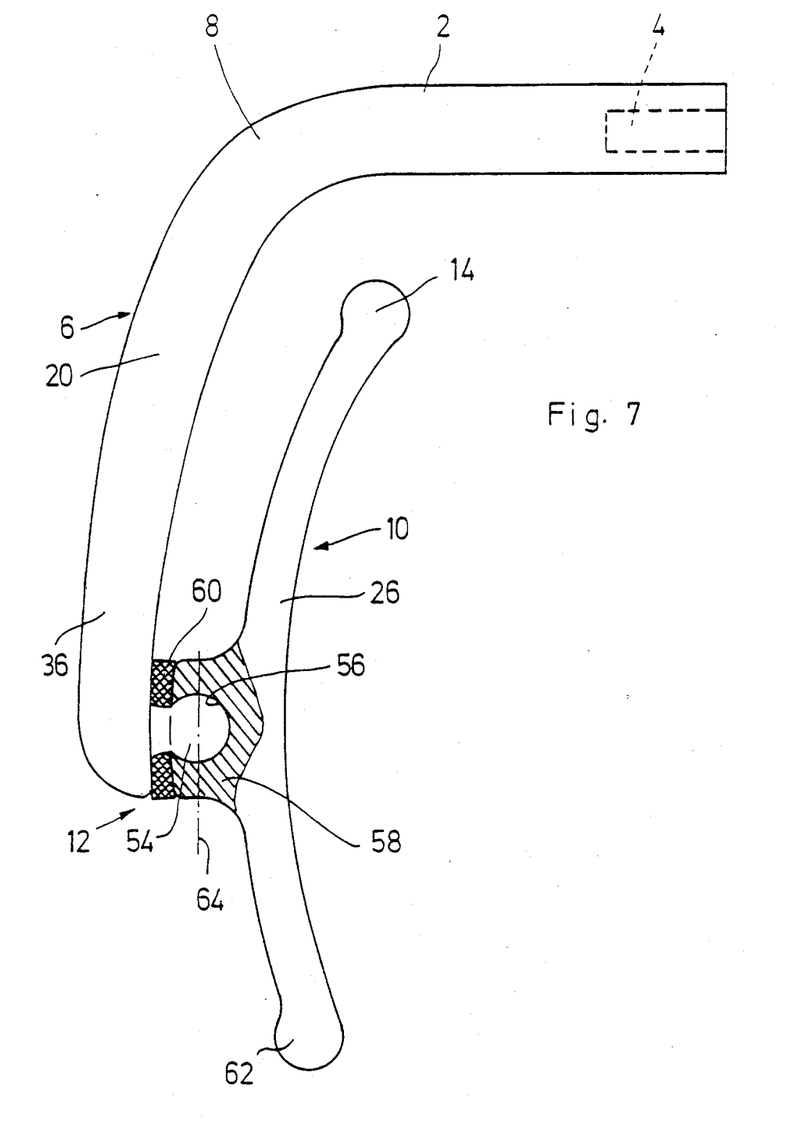
FIG. 7 a representation corresponding to FIG. 1 of a fourth preferred embodiment.

FIG. 7 shows a preferred embodiment which differs essentially from the preferred embodiments previously discussed by the fact that the transition area 12 between the design segment 10 and the connecting segment 6 is formed by means of a ball-and-socket joint.

This ball-and-socket joint comprises a ball 54 formed on the lower end of the connecting segment 6 and a ball-socket 56 fitted to the ball 54 and in which the ball 54 reposes and which is formed in a lug 58 formed in one piece on the design segment 10 of the side of the latter facing away from the ear. The lower end of the connecting segment 6 and the lug 58 have surfaces facing one another while retaining a certain interval from one another. In the intermediate space between these two faces is ring element 60 made of a cushioning elastic material is inserted concentric to the 54 ball. This has the consequence of allowing for the design element 10 to be deflected from its normal position to all sides against the springy elastic resistance of the ring element 10.

The design element 10 of the fourth preferred embodiment according to FIG. 7 has approximately the shape of the design element 10 according to FIG. 1, from which it differs in the fact that that it has a circular thickening on its lower end and that it gradually tapers, starting from its lower end 62 and moving in the direction of its upper end. The lug 58 with the ball-socket 56 is arranged in the middle region, specifically somewhat below the longitudinal center of the design segment 10.

It will be understood that the transition region 12 with the ball 54 and ball-socket 56 on the design segment can also be placed further downward than in the illustration. For the preferred embodiment according to FIG. 7, however, it serves the purpose to locate this transition region on the middle region of the design segment 10 near the longitudinal middle of the design segment 10, because otherwise the momentums to be absorbed by the elastic ring element 60 would otherwise be greater, which in turn would require a more rigid ring element, which would then be too inflexible for deflection movements of the design segment 10, as it is possible, around the axis 64 lying in the drawing plane of FIG. 7 and running vertical from top to bottom.

The ball-and-socket joint comprised of the ball 54 and the ball-socket 56 makes it possible, in addition to universal deflection movements, for rotations to occur of the design segment 10 around the axes running through the center of the ball.

The first segment 2, the transition region 8 and the connecting segment of the fourth preferred embodiment according to FIG. 7 basically have a similar configuration as the corresponding parts in the first preferred embodiment according to FIG. 1, whereby the differences consist solely of the fact that in the fourth preferred embodiment the connecting segment 6 is on the whole thicker and has no specific elastic region as in the elastic region 18 and that the transition region 8 is not flattened out. In addition, provision could also be made in a variant of this preferred embodiment according to FIG. 7 for its first segment, transition region and connecting segment to have the configuration according to FIG. 1 or according to FIG. 5 or according to FIG. 6.

Cushioning resilience, in the preferred embodiment according to FIG. 7, is a feature of especially the design segment 10 by virtue of its leaf-spring property and of the connecting segment 6 also by virtue of its leaf-spring property. The ring element 60 exercises a springy effect in the direction of the axis; the ring element 60 opposes an elastic resistance to the deflection movements of the design segment 10 on the ball 54 in contrast to the other.

Because of the configuration described the design segment 10 can assume a suitable position when the spectacles are put on by a rotation and deflection on the ball 54 and in addition can adapt to the shape of the ear and/or head by its own elastic deformation. Moreover, this adaptation is supported by the elastic properties of the connecting segment 6 and sometimes even of the transition region 8. In the event of a rather strong force directed in a longitudinal direction of the first segment 2 toward the front, i.e. to the right as seen in FIG. 7 the design segment 10 lying next to the head and ear would yield to the left as seen in FIG. 7 relative to the first segment 2. This is made possible for the design segment by virtue of the elastic property of the connecting segment 6, whereby the design segment 10 deflects as a whole simultaneously around the ball 54 in a counter-clockwise direction. Over this an elastic deformation is superimposed, at least in the upper half of the design segment 10, whereby by virtue of this deformation the upper half is somewhat extended and is shifted around the transition region 12 in the sense of a deflection. The deflection movement of the design segment 10 resulting in compensation against spring forces leads thus essentially to a shifting of the entire design segment 10 to the left (in FIG. 7), whereby this shifting is superimposed with a slight deflection of the design segment 10 in a counter-clockwise direction. By means of this a reacting force is obtained effective in the design segment 10, as in the first preferred embodiment according to FIG. 1, in which the share of the force component directed vertically upward is not made larger and which will strive to bring the first segment 2 and thus the temple essentially horizontal back into its original position.

Figure 8:
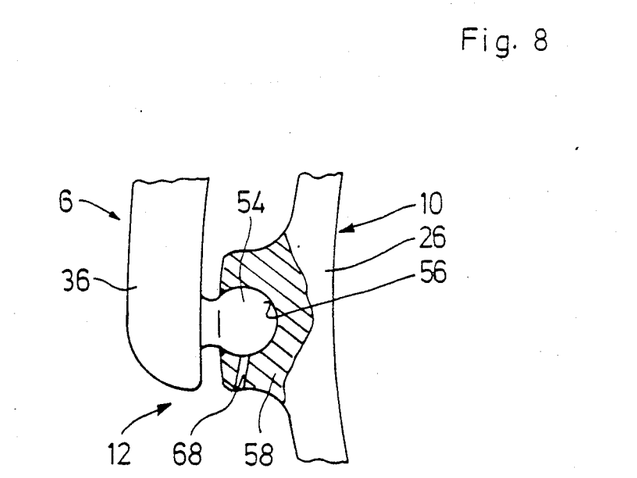
FIG. 8 cut-out representation of a variant of the preferred embodiment according to FIG. 7.

The variant shown in FIG. 8 of the preferred embodiment according to FIG. 7 differs from the preferred embodiment according to FIG. 7 in the fact that in the variant the ring element 60 is omitted, the the ball-and-socket joint composed of the ball 54 and the ball-socket 56 is made rigid by means of a cement and that in the lug 58 a cement channel has been formed. In addition, the temple end piece in accordance with FIG. 8 is the same as the temple end piece in accordance with FIG. 7. The temple end piece in accordance with FIG. 8 is first adapted individually to the wearer of the spectacles by bringing the design segment 10 into a suitable position by deflecting or rotating the ball in any direction desired, in which position the design segment is adapted as well as possible to the shape of the ear and head of the wearer of the spectacles. In this position the design segment 10 will then be permanently fixed on the connecting element by feeding cement through the cement channel 68 into the intermediate space between the ball 54 and the ball-socket 56. By virtue of this the flexibility in the ball-and-socket joint is obviated for later use. The elastic flexibility of the remaining elements, in particular that of the design segment 10 itself and of the connecting element 6 remains intact, however, and can be increased by means of additional elastic regions near the lower and/or upper end of the connecting segment 6, as provided for in the preferred embodiment according to FIG. 1, or by an additional elastic region in the design segment 10 near the lower transition region 12.

Figure 9:
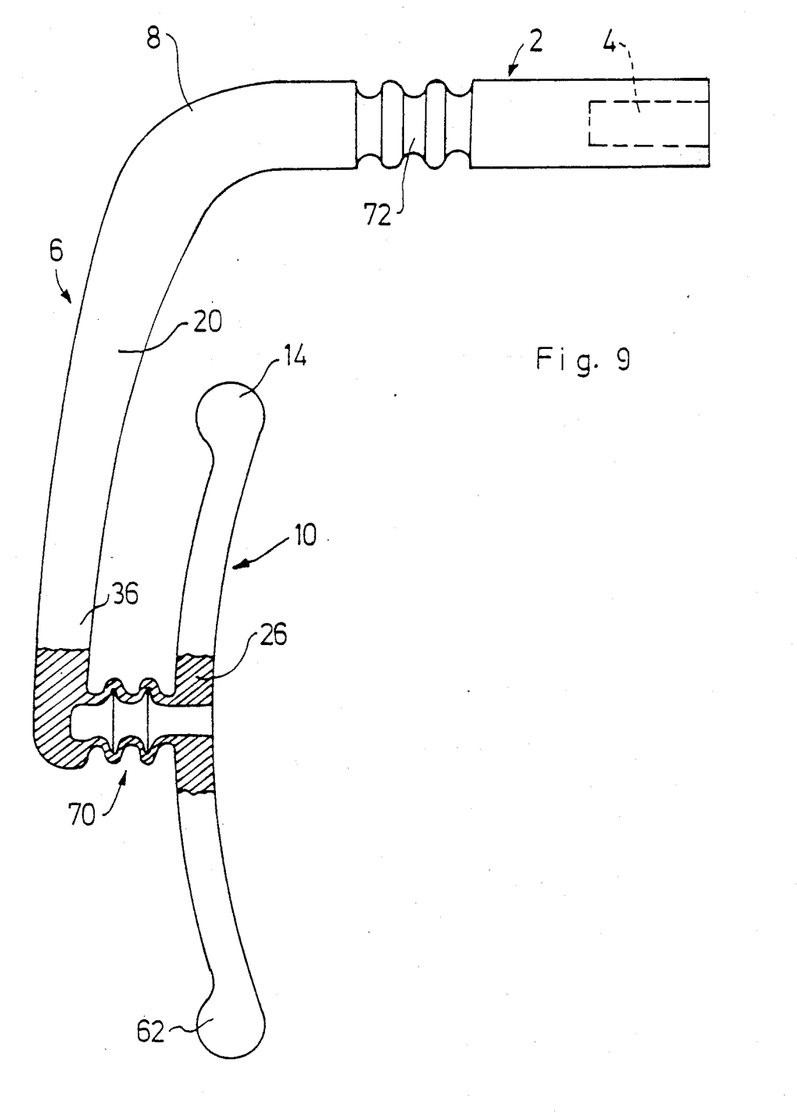
FIG. 9 a representation corresponding to FIG. 1 of a fifth preferred embodiment.

The fifth preferred embodiment according to FIG. 9 resembles the fourth preferred embodiment according to FIG. 7 and differs from the latter essentially in the fact that the ball-and-socket joint cushioned by means of the ring element 60 is replaced by a cylindrical elastic element.

The cylindrical elastic element is formed in the preferred embodiment according to FIG. 9 as a corrugated tube spring 70, which is formed in one piece with both the connecting element 6 and the design segment 10. Such a configuration in one piece is made possible by the choice of a suitable plastic material. The axis of the corrugated tube spring 70 hollow on the inside runs essentially parallel to the axis of the first segment 2 and thus of the temple, not shown. The corrugated tube spring 70 is connected at its left end with the lower end of the connecting segment and at its right end as seen in FIG. 9 with the design segment, specifically at its longitudinal center. The corrugated tube spring 70 go to make possible both an axial compression and a curvature of itself.

The design segment 10 of the fifth preferred embodiment according to FIG. 9 is essentially the same as the design segment 10 of the first preferred embodiment according to FIG. 1, whereby the differences consist of the fact that in the fifth preferred embodiment a circular thickened end has been provided at the lower end 62 and that the design segment is supported at its longitudinal center and not at its lower end and held there. The connecting segment 6 of the fifth preferred embodiment resembles that of the fourth preferred embodiment according to FIG. 7, whereby in comparison thereto the difference consists of the fact that the connecting segment 6 of the fifth preferred embodiment proceeding from its upper end tapers gradually below. The first segment 2 of the fifth preferred embodiment resembles the first segment of the fourth preferred embodiment and manifests a difference to the latter by the fact that it has a region 72 having successive circumferential grooves and protruding circumferential rims which enables it in an especially simple and visible manner to adjust the length of the first segment 2 by lengthening or compressing the region 72 by supplying heat or if necessary by the use of an appropriate tool. The first transition region 8 corresponds to the transition region 8 of the fourth preferred embodiment.

By virtue of the corrugated tube spring 70 the design segment 10 can be adjusted as a whole in the direction of the axis of the corrugated tube spring and deflected laterally by bending the corrugated tube spring 70 at will as well as by rotating around the axis of the corrugated tube spring 70 to a limited degree. This makes it possible for the design segment 70 to be set in the most suitable position behind the ear of the wearer of the spectacles, whereby the design segment 10 is held by the corrugated tube spring 70 and by virtue of the latter's leaf-spring type of formation in retained there in an elastic fit on the ear. The temple end piece according to FIG. 9 essentially absorbs any stronger charging by means of axial compression of the corrugated tube spring, whereby this is superimposed with a certain deformation of the leaf-spring type of connecting segment 6 and of the design segment 10. Essentially, however, the design segment 10 is shifted parallel to the first segment 2, to the left as seen in FIG. 9, whereby the direction of the reacting force on the design segment 10 is essentially unchanged. The preferred embodiment according to FIG. 9 is particularly suited to such design segments 10 as are formed symmetrical to their longitudinal center, essentially run at right angles and are situated on the ear at the rear. The reacting force exercised on the design segment 10 will then run essentially horizontal in a sharply attenuated condition, i.e. without any appreciable force component directed upward. If in the preferred embodiment according to FIG. 9 the design segment 10 were to fit predominantly with its upper half, it would be deflected around the corrugated tube spring 70 by a fiarly strong charging in a counter-clockwise direction, whereby a more favorable direction of the reacting force on the design segment 10 wound ensue, as this has been explained in detail for FIG. 1.

Figure 10:
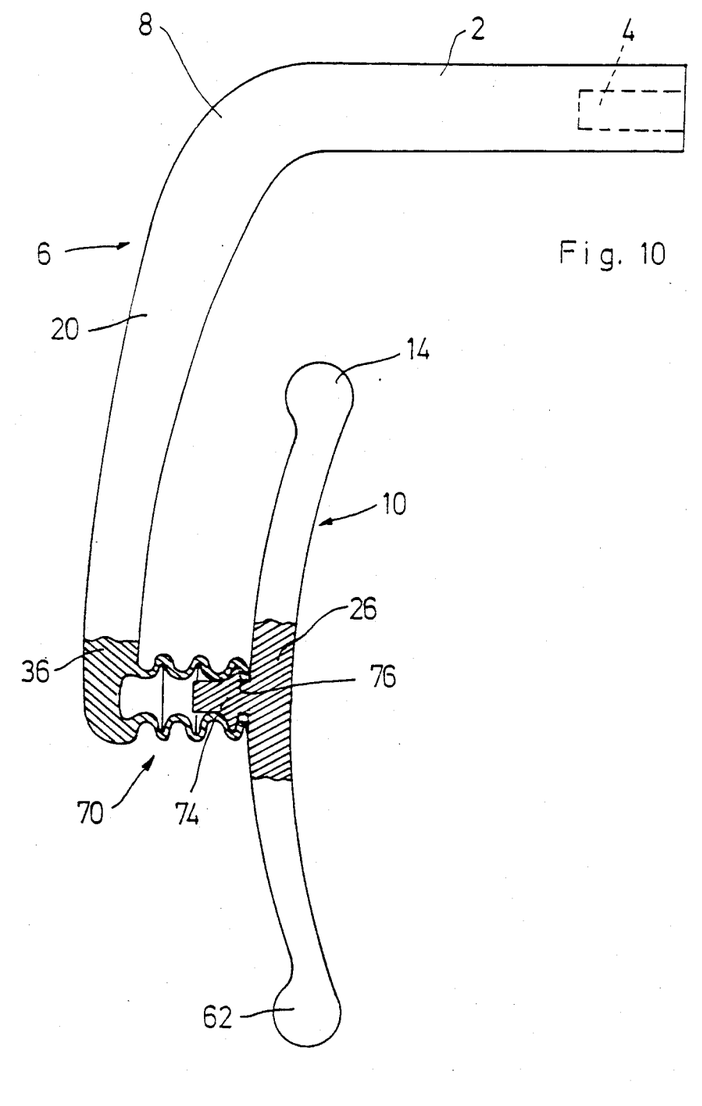
FIG. 10 a representation corresponding to FIG. 1 of a sixth preferred embodiment.

FIG. 10 shows a sixth preferred embodiment that is extensively the same as the fifth preferred embodiment. Apart from the fact that in the sixth preferred embodiment the specially designed region 72 is not supplied, the difference in the preferred embodiment according to FIG. 9 lies in the fact that the corrugated tube spring 70 is formed in one piece not with the design segment 10, but only with the connecting segment 6. On the design segment 10, which moreover has the same formation as the design segment 10 according to FIG. 9, a plug 76 is formed in its longitudinal center, this plug 74 having a circumferential flange 76 on it. The right end, as seen in FIG. 10, of the corrugated tube spring 70 is adjusted on the plug 74 in such a manner that the corrugated tube spring 70 grips around the flange 76 and by virtue of this is connected sufficiently firmly to the design segment 10. The above described configuration makes it possible to produce both the corrugated tube spring 70 and the plug 74 at a longer length than necessary and then to shortened them by the required measure before connecting the corrugated tube spring 70 to the design segment 10. By determining the length of the corrugated tube spring 70 the position of the design segment 10 can set adjusted and fixed with respect to the first segment 2 the latter's longitudinal direction. The length of the plug 74 in turn will determine the degree to which the corrugated tube spring 70 will be rigid because of its length, i.e. how bending resistant and axially rigid the corrugated spring tube 70 will be.

In addition the pattern of action of the temple end piece according to FIG. 10 is in accord with the pattern of action of the temple end piece according to FIG. 9.

Figure 4:
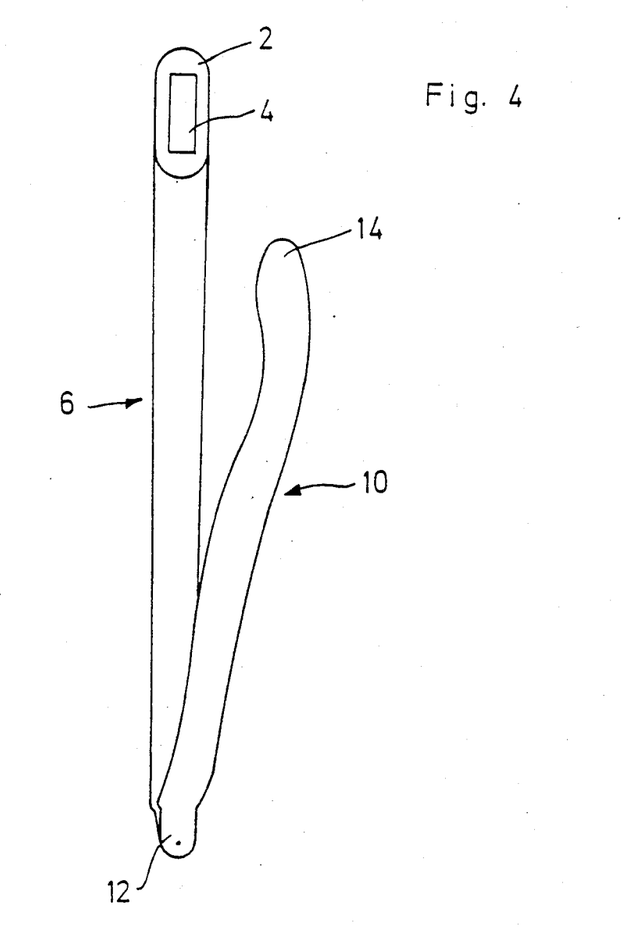
FIG. 4 a view of the temple end piece according to FIGS. 1 through 3 from the right in FIG. 1.

The fact that in the preferred embodiment according to FIG. 10 the design segment 10 and the connecting segment 6 are made separate from one another makes it possible in a manner similar to that of the first preferred embodiment according to FIGS. 4 and 5 to fit together a unit from the first segment 2 and the connecting segment 6 with differing design segments 10 tailored to each individual case. The same is also true for the preferred embodiments according to the FIGS. 7 and 8.

In the above a number of preferred embodiments are discussed. It will be understood that numerous other preferred embodiments are possible for this invention.

A temple end piece for a temple of a spectacle frame consists of an essentially straight first segment in the longitudinal direction of the spectacles, a connecting segment running from the first segment downward, and a design segment, which is intended to fit on the head and/or behind the ear. The design segment in its length is carried by the connecting segment and supported by it, whereby this support occurs at the longitudinal center or at the lower end of the design segment, so that at least the upper half of the design segment juts free upward toward the first segment. The connecting segment, the design segment and the transition region between the two are at least partially formed out of such material or even provided by additional elastic regions that the design segment can be deflected against elastic force. This will cause a comfortable, cushioned fit of the design segment on the head of the wearer of the spectacles and will also cause the design segment under fairly heavy charging to be deflected in such a way that the reacting forces caused by this deflection will restore the spectacles to their original position and not be dislodged.

What is claimed is:

1. A temple end piece for a temple of a spectacle frame, comprising:
(a) a substantially straight first segment extending horizontally in the longitudinal direction of a temple;
(b) a connecting segment extending substantially downwardly from one end of said first segment; and
(c) an elongated, elastically deflectable fitting segment intended to fit on the head and behind the ear and which is connected to the lower end of said connecting segment;
(d) said fitting segment having an upper free end extending substantially upwardly from a first transition region formed between said lower end of said connecting segment and said fitting segment, said transition region being located at or below the mid-point of said fitting segment;
(e) said connecting segment being stiffer than said fitting segment;
(f) said transition region said being resilient whereby said fitting segment is tiltable relative to the connecting segment in the transition region.

2. Temple end piece according to claim 1, wherein said fitting segment is arcuate and has a center of curvature located forwardly toward the ear.

3. Temple end piece according to claim 2, wherein said fitting segment generally extends in a plane disposed at an angle with respect to a plane defined by and extending through said first segment and said connecting segment.

4. Temple end piece according to claim 1, wherein said fitting segment is an elastic element.

5. Temple end piece according to claim 4, wherein said fitting segment has varying elastic rigidities along its length.

6. Temple end piece according to claim 5, wherein said elastic rigidity of the fitting segment near said first transition region is less than in areas further removed from said first transition region.

7. Temple end piece according to claim 1, wherein at least one free end of the fitting segment is thickened.

8. Temple end piece according to claim 1, wherein said fitting segment has a circular or oval profile.

9. Temple end piece according to claim 1, wherein said connecting segment is curved in an arc.

10. Temple end piece according to claim 1, wherein said connecting segment gradually tapers, beginning with its upper end connected to the first segment.

11. Temple end piece according to claim 1, wherein the connecting segment is an elastic element.

12. Temple end piece according to claim 1, wherein the connecting segment has an elastic region near its lower end connected with the fitting segment which is more flexible than the middle region of the connecting segment.

13. Temple end piece according to claim 12, wherein said elastic region is a region with diminished area of section.

14. Temple end piece according to claim 1, wherein the connecting segment has an elastic region near its upper end connecting with the first segment which is more flexible than the middle region of the connecting segment.

15. Temple end piece according to claim 14, wherein said elastic region near its upper end is a region with diminished area of section.

16. Temple end piece according to claim 15, wherein the first segment and the connecting segment are formed in one piece.

17. Temple end piece according to claim 16, wherein a second transition region connecting the first segment with the connecting segment at the ends of these segments has a course that is in the form of an arc.

18. Temple end piece according to claim 19, wherein the second transition region is flattened out in such a manner that this flattening is located essentially in the plane determined by the first segment and the connecting segment.

19. Temple end piece according to claim 17, wherein the second transition region is provided with a slot following the curvature of the second transition region.

20. Temple end piece according to claim 19, further comprising an insert made of elastic material inserted into the slot.

21. Temple end piece according to claim 16, wherein said second transition region is formed as an elastic element.

22. Temple end piece according to claim 1, wherein the connecting segment and the fitting segment are formed in one piece.

23. Temple end piece according to claim 22, wherein the first transition region connecting the connecting segment with the fitting segment at the ends of these segments is in the form of an arc.

24. Temple end piece according to claim 23, wherein said first transition region is flattened out in such a manner that the flattening is situated essentially in the plane determined by the fitting segment and the connecting element.

25. Temple end piece according to claim 23, wherein said first transition region is provided with a slot following the curvature.

26. Temple end piece according to claim 25, further comprising an insert made of elastic material inserted into the slot.

27. Temple end piece according to claim 22, wherein said first transition region between said connecting segment and said fitting segment is formed as an elastic region.

28. Temple end piece according to claim 1, wherein said connecting segment and said fitting segment are made as separate parts.

29. Temple end piece according to claim 28, further comprising a plug and a plughole, into the latter of which the plug is inserted, connecting said connecting segment and said fitting segment, the plug being formed in one of said segments and said plughole in the other of said two segments.

30. Temple end piece according to claim 29, wherein said plughole is a through-borehole on the fitting segment and said plug is formed in a lower end region of said connecting segment.

31. Temple end piece according to claim 28, further comprising a ball-and-socket joint connecting said connecting segment and said fitting segment.

32. Temple end piece according to claim 31, further comprising an elastic ring element essentially concentric to said ball-and-socket joint inserted between said connecting segment and said fitting segment.

33. Temple end piece according to claim 1, further comprising a cylindrical elastic element connecting said connecting element and said fitting segment.

34. Temple end piece according to claim 33, wherein said elastic element has a longitudinal axis extending essentially in the direction of the first segment.

35. Temple end piece according to claim 33, wherein said elastic element is a corrugated tube spring.

36. Temple end piece according to claim 31, wherein the fitting segment is connected in its middle region with the connecting segment.

* * * * *